May 1, 1945.                J. M. GEIGER                2,374,929
                              WEED PULLER
                           Filed Nov. 6, 1943
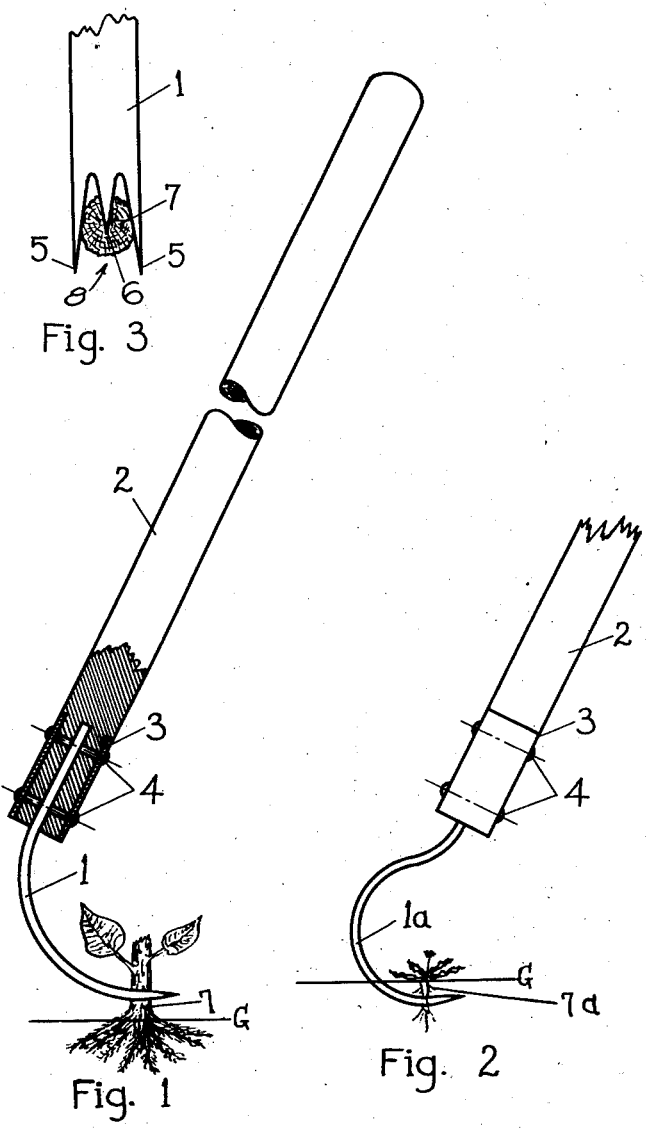
INVENTOR.
Joseph M Geiger Patented May 1, 1945

2,374,929

UNITED STATES PATENT OFFICE 2,374,929

WEED PULLER

Joseph M. Geiger, Harrisburg, Pa.

Application November 6, 1943, Serial No. 509,223

4 Claims. (Cl. 294—50.6)

My invention relates to an improvement in garden and lawn weed pulling tools, particularly for removing weeds or other growths, without causing damage to surrounding vegetation.

I am aware there are many tools for destroying weeds by cutting them off below the surface of the ground. A more effective method is to pull and bodily remove the roots, rather than break them off. With this in mind, I have designed my improved weed puller for bodily removing a weed, so that its roots cannot be cut off or broken off, during use.

One object is to provide an implement that will pull a weed having a multiplicity of fine roots, as a plantain, or a dandelion, having more of a single root formation, which are common garden and lawn pests.

Another object was to design a tool that is cheap and easy to make, having no moving parts to wear and get out of order, and which can be re-sharpened if it becomes worn. Another important feature is that it requires a small amount of metal in its construction.

A further object of the invention is to shape the implement so that its outer prongs will serve as guides and their tapering shape on the inside edge will squeeze the root, thus getting a firm grip on the root. The short prong in the center will penetrate the root, but not deep enough to cut it off. In this manner, the implement will impose on the weed the combined effect of the two long outer prongs and the short inner prong.

A further object is to provide an improved weed puller having guide members associated with a stem or root-penetrating member, thereby facilitating engagement with the body of the weed and the complete removal thereof.

A still further object is to provide a small implement which, when used, will not impair surrounding vegetation, or unduly loosen soil or turf adjacent the weeds.

These and other objects and advantages will become apparent, upon reference to the following specification, in which Figure 1 is a side view of the preferred embodiment of my improvements, shown in association with a weed.

Figure 2 is a fragmentary side view of a modification, shown in association with a weed.

Figure 3 is a fragmentary elevation of the prongs and a portion of the shank, as viewed from beneath the implement, showing it in engagement with a weed stem or root.

Upon reference to the drawing, a fork like member 1, having a shank terminating in outer prongs 5 and a central prong 6, is attached to the elongated handle 2 by means of ferrule 3 and rivets 4. The member 1 projects outwardly and away from the handle, preferably in a curve as indicated in Figure 1, so as to facilitate the use of the implement in a manner similar to the movements commonly employed in using a garden hoe.

As indicated in Figure 3, the fork member 1, consists of two outer prongs 5 and a central prong or spike 6. The prongs 5 have parallel outer edges and are of equal length. Their inner edges, as illustrated, are tapered and converge to the portion of the shank of the fork where the central prong 6 is located. This prong 6 is positioned midway between the prongs 5 and is not as long. The prong 6 is pointed like a spike, so that it may bite into and penetrate the body of a weed stem or weed root. In this manner, the prong 6 engages the root and penetrates it such a distance that the stem or root is impaled on the prong. The prong 6 is, therefore, similar to a hook, which may be pulled, and the impaled stem or root pulled with it from the ground.

As illustrated in Figure 1, the fork and prongs are preferably curved to facilitate handling and more efficient results. The prongs also extend in the same plane, and the ends of the outer prongs 5 and the central prong 6 are spaced, as indicated in Figure 3, so that a mouth 8 is defined. By making the prong 6 shorter than the others, the entry of the stem or root, into the mouth, is facilitated. This mouth is flanked by the inner tapered edges of prongs 5, and the prong 6 projects into the area of this mouth, and is centered, thereby affording better access to the body of the weed.

In Figure 2, the fork member 1a is curved in a manner different from that in Figure 1, otherwise the embodiments are the same. In Figure 2, the tool is illustrated in use by inserting the prongs under the ground.

The weed 7 in Figure 1, has a stem and fine roots, while that in Figure 2, indicated as 7a, has a single root. In both views, the ground is indicated as G.

In use, the implement is used like the familiar garden hoe. Upon reference to Figure 1, the user would stand, facing the left of the drawing and, on grasping the handle 2, would pull it downwardly toward his feet, and into the weed stem, as indicated.

The actual results achieved from this movement of the implement are believed to be obvious from the foregoing description. In bringing the fork member down and about a weed, as illustrated in Figure 1, the projecting prongs 5 are moved to either side of the stem or root 7. The stem or root 7 is then within the confines of the mouth 8. Further movement of the fork toward the weed causes the converging edges to guide the tool about the root, center it and bring it into biting engagement with the spike or prong 6. The tapering prongs 5 engage the sides of the stem or root, thereby holding it in position for penetration by the prong 6. Further movement or pressure by the user, on the fork, pushes the prong 6 into the body of the stem or root 7, but does not cut it off, as the narrowing, converging edges of prongs 5, being rigid about the root, compress and squeeze and grip the root, force it into the prong 6, and prevent the prong 6 from going on through and cutting it off. When the stem or root is thus impaled, an upward pull on the implement will pull the root weed from the ground without cutting or tearing it apart. As the tool is very narrow, it will be seen that the adjacent soil and vegetation will not be injured.

Upon constant use, the penetrating prong 6 may fail to perform its function, due to dullness and wear. This member is so designed that it may be sharpened, to facilitate entry and penetration of the weed stem or root.

Other embodiments may be made, embodying the improvements without departing from the scope of the appended claims.

I claim:

1. A hoe type weed puller, comprising a handle, a fork at the end thereof, said fork having two outer prongs with parallel outer edges and one central prong projecting from the handle at an angle in the same plane, the outermost prongs being of equal length, and the central prong being of less length than said outer prongs and being pointed for penetrating the body of a weed.

2. A hoe type weed puller comprising a handle, a fork at the end thereof, said fork having two outer prongs with parallel outer edges and one central prong curving away from the handle and terminating beyond the longitudinal axis thereof, the outermost prongs being of equal length, and the central prong being of less length than said outer prongs and being pointed for penetrating the body of a weed.

3. A weed puller, including a fork member comprising a central pointed root-penetrating prong and two outer guide prongs, spaced from said central prong, said guide prongs having parallel outer edges extending beyond the end of said central prong.

4. A weed puller, including a fork member comprising a central pointed root-penetrating prong and two outer guide prongs, spaced from and longer than said central prong, said guide prongs being in the same plane and having their adjacent edges converging toward said central prong and their remote edges parallel.

JOSEPH M. GEIGER.